UNITED STATES PATENT OFFICE.

HERMAN FRASCH, OF CLEVELAND, OHIO.

PROCESS OF MAKING ELEMENTS FOR THERMAL ELECTRIC GENERATORS.

SPECIFICATION forming part of Letters Patent No. 286,288, dated October 9, 1883.

Application filed January 8, 1883. (No specimens.)

*To all whom it may concern:*

Be it known that I, HERMAN FRASCH, of Cleveland, in the county of Cuyahoga and State of Ohio, have invented certain new and useful Improvements in Process of Making Elements for Thermal Electric Generators; and I do hereby declare the following to be a full, clear, and exact description of the invention, such as will enable others skilled in the art to which it appertains to make and use the same.

My invention relates to a process for making elements for thermal electric generators; and it consists in making an element of any desired shape, construction, and material, and subjecting the element to the action of another substance capable of changing the element into a material of a different position in the thermal electric series.

I will describe some of the ways of producing an element in accordance with my improved process.

An element may be made of copper in the form of a bar, tube, wire, or sheet-copper bent into any desired shape. This element is placed in a closed retort and heated to a cherry-red heat, and then a vessel containing sulphur volatilized, which operates to convert the copper into copper-sulphide, the crystalline structure of which is different from that of a copper-sulphide element formed by casting. Any alloy— such as German silver, or brass, or zinc—may be employed instead of copper and subjected to the same process. Instead of sulphides, selenides or tellurides may be formed. Phosphorus or any element in gaseous form capable of uniting with metals may be employed instead of sulphur, as hereinbefore described. I have demonstrated the fact by actual experiment that thermal electric elements produced in the manner described have a much higher electro-motive force than elements of the same chemical composition, but of different crystalline structure; and, further, the ductility of the metals or alloys of which the elements are made is such as to allow of the elements being made of forms and shapes not possible to be obtained by the employment of the brittle sulphides resulting from the ordinary method of casting.

Having fully described my invention, what I claim as new, and desire to secure by Letters Patent, is—

1. The method of making elements for thermal electric generators, consisting in first forming an element of any desired material, shape, and construction, and then subjecting it to the action of another substance capable of changing the element into a material of a different position in the thermal electric series, substantially as set forth.

2. The method of making an element for thermal electric generators, consisting in forming an element of copper in the form of a bar, tube, wire, or sheet-copper bent or otherwise formed into any desired shape, then heating such element and subjecting it to the direct action of sulphur-vapors and converting it into copper-sulphide, substantially as set forth.

In testimony whereof I have signed this specification in the presence of two subscribing witnesses.

HERMAN FRASCH.

Witnesses:
F. O. McCLEARY,
GEORGE COOK.